Sept. 19, 1961 — R. GENDREU ET AL — 3,001,115
LINEAR MOTOR SYSTEM

Filed Dec. 31, 1958 — 6 Sheets-Sheet 1

United States Patent Office 3,001,115
Patented Sept. 19, 1961

3,001,115
LINEAR MOTOR SYSTEM
Robert Gendreu, Etienne Honore, and Emile Torcheux, Paris, France, assignors to Compagnie Generale de Telegraphie Sans Fil, a corporation of France, and Societe Marocaine de Recherches, d'Etudes et de Developpements "Somarede," a corporation of Marocco
Filed Dec. 31, 1958, Ser. No. 784,160
Claims priority, application France Jan. 7, 1958
12 Claims. (Cl. 318—137)

The present invention relates to servo systems. More particularly, it relates to servo systems of the type wherein a driving member performs a translation movement.

In commonly used servo systems of this type, the driving member is generally a coil through which flows a control D.C. current and which is subjected to the action of a permanent magnetic field.

Such types of servomotors present, however, several disadvantages which have restricted in the past their use in certain fields; among others, they are difficult to build and certain connections create difficult problems.

In order to overcome this difficulty, servo systems with so-called facial magnetism have been proposed. In such types of servos, the moving member is formed with a magnetic piece the polar surfaces of which are in perpendicular relationship with the axis of translation of the moving member and are separated from the polar surfaces of the fixed piece by a small air-gap. This occurs in certain types of relays and electro-magnets, for instance. However, in these servomotors, for a given control signal, the magnetic force acting on a polar surface of the moving member depends varies as a function of the position of the latter.

It is an object of the present invention to avoid such drawbacks.

More particularly it is an object of the invention to provide a servomotor of the facial magnetism type wherein the magnetic force acting on the movable member is substantially independent of the position of this member with respect to the fixed magnetic pieces.

According to a preferred embodiment, a servomotor according to the invention comprises two magnetic pieces, in symmetrical relationship to one another relative to a plane and having each two polar surfaces, at least one of which is substantially parallel to said plane. A mobile member is positioned for moving along an axis of translation perpendicular to this plane under the action of magnetic forces and is subjected to the action of a braking hydraulic system.

The respective coils of the stationary magnetic pieces are respectively fed from two A.C. voltages of the same frequency, the first of these voltages being the sum of a fixed—or local—voltage and of a variable, or signal voltage and the second being the difference of said two voltages.

It is a particular object of this invention to provide assemblies comprising a servo system of the above type and a variable inductance assembly as used in the computor networks as described in the copending application Serial Number 709,383, filed by the applicant January 16, 1957 for "Improvements in Transformer Circuits."

The invention will be best understood from the following description and appended drawing, wherein.

Figure 6:
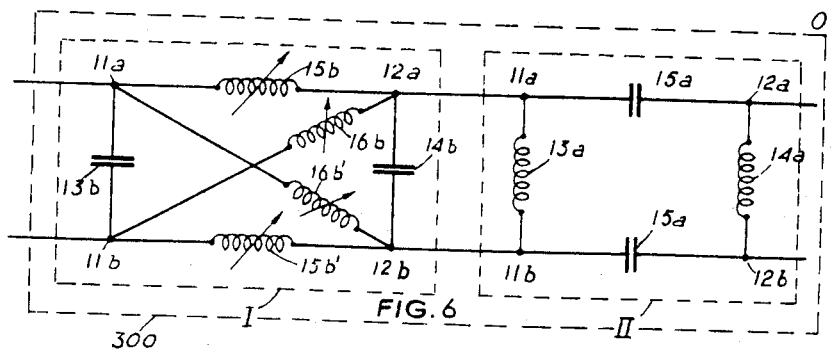
FIG. 6 is a diagram of a known calculator network for the construction of which the present invention may be used.
Figure 7:
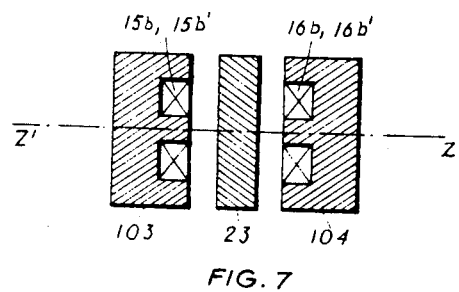
Figure 13:
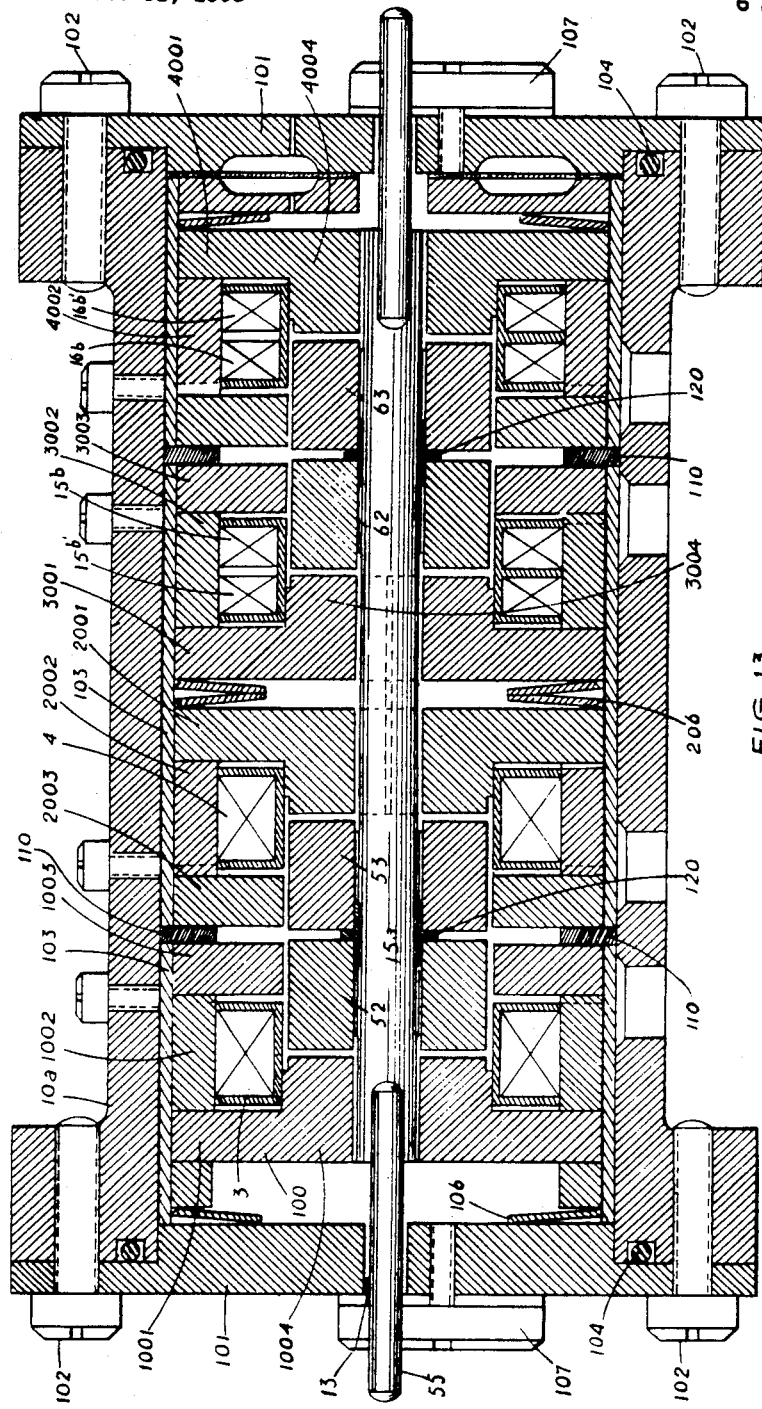

FIG. 7 diagrammatically shows a detail which may be incorporated into the circuit of FIG. 6;

FIGS. 8 to 12 are circuit diagrams incorporating the invention;

FIG. 13 is a sectional view of an assembly incorporating the variable inductance assembly of a calculator network and a unit according to the invention.

Figure 1:
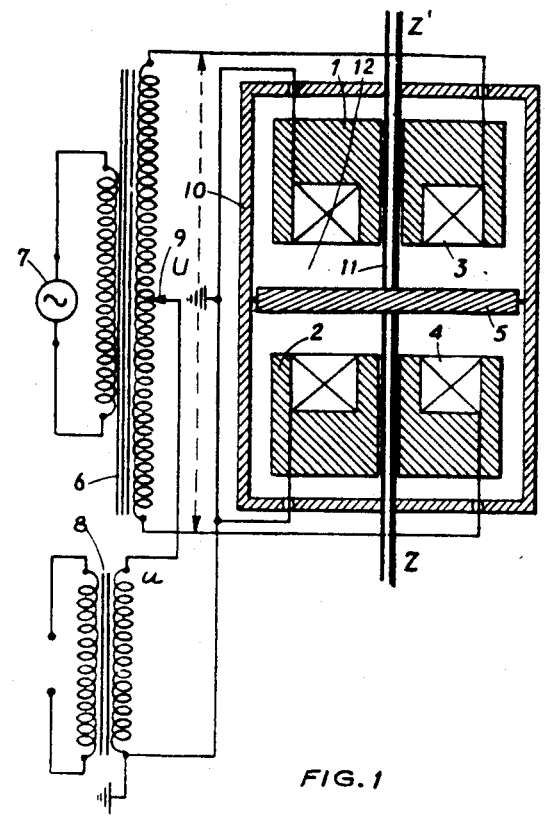
FIG. 1 shows very diagrammatically a device according to the invention.

As shown in FIG. 1, a servomotor according to the invention comprises two stationary magnetic pieces 1 and 2 having a generally toroidal shape.

Pieces 1 and 2, which have a common axis ZZ', are provided with coaxial slots adapted to receive respective windings 3 and 4. In the space separating pieces 1 and 2, is positioned a movable plate 5 of ferromagnetic material which is supported on a shaft 11. Shaft 11 is slidably mounted within bores provided in pieces 1 and 2, coaxially therewith.

Coils 3 and 4 have one end grounded, their respective other ends being connected to the two ends of the secondary winding of a transformer 6, the connections being poled in such a way that electromagnetic forces of opposite directions act on the opposed faces of plate 5. The primary winding of this transformer 6 is fed from an A.C. supply source 7 of constant frequency and of constant amplitude. The secondary winding has its midpoint 9 connected to one terminal of the secondary winding of a transformer 8, the other input terminal of which is grounded. A control signal or error voltage is fed to the primary winding of the same transformer which is of variable amplitude. This voltage has the same frequency as the voltage derived from source 7, and is in phase or in phase opposition with the same.

The described assembly is comprised, except for the transformers, in a closed cylindrical oil-filled envelope 10, coaxial with shaft 11 which is slidably supported in opposed walls of the envelope.

The operation of the assembly is as follows:

U being the voltage across the secondary winding of transformer 6 and $u$ the voltage across the secondary winding or transformer 8, or signal voltage, a voltage $U+u$ will appear across one of the windings 3 and 4 and a voltage $U-u$ across the other.

$I_1$ and $I_2$ being the currents flowing respectively in windings 3 and 4, and $e_1$ and $e_2$, the respective widths of the gaps separating, pieces 1 and 2 from plate 5, the attraction forces acting on plate 5 due respectively to windings 3 and 4 are:

$$F_1 = m(I_1/e_1)^2$$
$$F_2 = m(I_2/e_2)^2$$

wherein $m$ is a constant. The resulting force F acting on plate 5 is $$F = F_1 - F_2 = m(I_1/e_1)^2 - (I_2/e_2)^2$$

The admittance (G) of a circuit consisting of a winding being substantially proportional to the corresponding gap, if its ohmic resistance is disregarded, the corresponding current values are:

$$I_1 = n(U+u)e_1$$
$$I_2 = n(U-u)e_2$$
(1)

where $n$ is a constant.

From the above expressions, it follows that:

$$F = F_1 - F_2 = p[(U+u)^2 - (U-u)^2] = 4p \cdot U \cdot u$$

$p$ being a constant factor. The sign of the force is in dependency of the phase relation between U and $u$. Force F is directed in one direction when the voltages U and $u$ are in phase, and in the opposite direction, if they are in phase opposition.

Since voltage U is constant, F is proportional to signal $u$. Accordingly, a motive force proportional to the signal voltage acts on plate 5 and sets it in motion. This motion is then braked by the oil filling casing 10 and the braking force is substantially proportional to the speed $v$ thereof.

In practice, a balance between the braking force and the motive power is rapidly reached and the speed $v$ of plate 5 becomes almost immediately uniform instead of being uniformly accelerated as would be the case, were it not for the braking effect of the oil. This speed is proportional to voltage since $$F = 4pUu = K.v$$

When the signal voltage $u$ is zero, speed $v$ is also zero and the mobile plate comes to rest.

It is obvious that, in order for the above relations to be valid, the two coil cores must be non-saturated. Besides, it is also necessary that gaps symbolized by $e_1$ and $e_2$ should not be too large to avoid any flux dispersion. Actually, unless the gaps are small with respect to the dimensions of the polar pieces, in which case flux dispersion may be disregarded, a substantial amount of magnetic lines of force do not follow the shortest way between elements 1 or 2 and plate 5 and the admittance of the corresponding coil no longer obeys relation (1).

Figure 2:
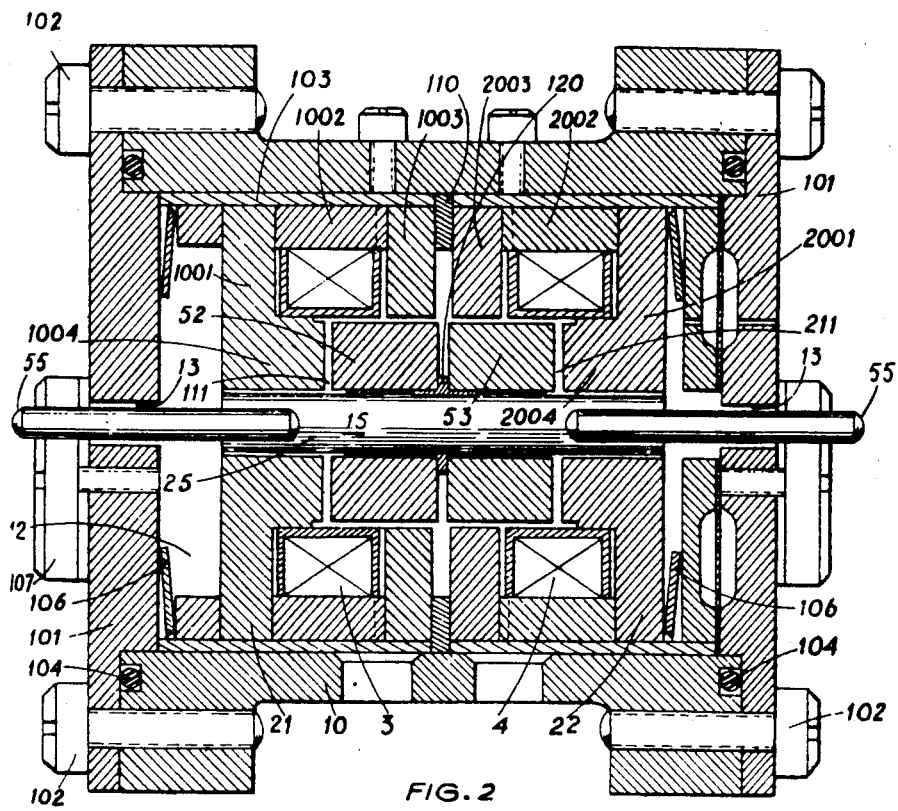
FIG. 2 is a sectional and more detailed view of an embodiment of the invention.

The servomotor shown in FIG. 2 avoids such drawbacks. It comprises a casing of a non magnetic material in the shape of a cylinder of revolution. This cylinder is closed by means of two end covers 101. Inside casings 10 are mounted coaxially therewith stationary magnetic assemblies 21 and 22 and a mobile assembly 25, respectively corresponding to elements 1, 2 and 5 of FIG. 1.

Assembly 21 comprises a circular plate 1001 having a hub 1004, an adjacent ring 1002 and a ring 1003 having a smaller diameter than ring 1002 and adjacent to the same. Elements 1001, 1002 and 1003, which may of course be integral, are inserted into a tube or sleeve 103, made of a non magnetic material. Another assembly comprising similar elements 2001, 2002 and 2003 is inserted in another tube 103. The two tubes 103 are inserted into casing 10 symmetrically with respect to a central non magnetic ring 110. Springs 106, respectively compressed between covers 101 and plates 1001 and 2001, contribute to hold the assembly together. Windings 4 and 3 are respectively located in the space portions defined by the two magnetic assemblies 1001 to 1003, and 2001 to 2003.

End covers 101 are secured to casing 10 by screws 102, rubber gaskets 104, being inserted between casing 10 and covers 101 to assure the tightness of the assembly.

The mobile assembly 25 comprises a shaft 15, slidably mounted into corresponding axial bores provided in hubs 1004 and 2004 and having two journals 55, slidably fit in bearings 13, provided in end covers 101. Shaft 15 and journals 55 are made of a non magnetic material. The central portion of shaft 15 carries two similar blocks 52 and 53, separated from one another by a non magnetic bushing 120, fitted on shaft 15 and having a central flange.

Blocks 52 and 53 have their ends and their lateral walls separated by small air gaps from the corresponding hubs 1004 or 2004 on the one hand and rings 1003 or 2003 and coils 3 or 4 on the other. Casing 10 is filled with oil which may be poured therein through openings which are provided in covers 101 and which may be closed by means of threaded plugs 107.

Figure 3:
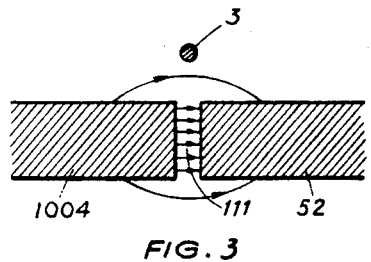
FIG. 3 is a schematic view showing the flux distribution in the device according to the invention.

The air gaps are very small compared to the dimensions of blocks 52 and 53 and the variable air gaps 111 and 211 are entirely within the coils and the entire extent thereof is traversed by the magnetic flux. The dispersion flux is thus very small and does not vary, whatever the position of blocks 52 or 53 with respect to the adjacent hub 1004 or 2004. This is readily seen from FIG. 3 showing the dispersion of the lines of force between hub 1004 and block 52. It should also be noted that, contrary to what happens in the device of FIG. 1, the whole of the frontal surfaces of pieces 52 and 53, facing hubs 1004 and 2004 respectively, share in the production of the magnetic flux. It may also be seen that the two assemblies are magnetically isolated from one another by means of ring 110 and bushing 120. The magnetic fluxes produced by windings 4 and 3 are thus perfectly decoupled.

The arrangement shown in FIG. 2 thus results in an improved linearity of the servomotor. The displacement speed of the mobile assembly 25 is made independent of the width of the air gaps.

A servomotor of this type has been constructed having the following characteristics:

$f = 400$ c./s.
$U = 15$ volts (R.M.S.)
$S = 0.7$ cm.$^2$
$N = 800$ turns
$B_{max} = 3000$ Gauss
$E = 0.45$ mm.

where:

$f$ is the common frequency of the local and signal voltages;
$U$ is the amplitude of the local voltage;
$N$ is the number of coil turns;
$B_{max}$, the maximum induction in the polar pieces obtained for $U = u$, induction beyond which saturation occurs;
$E =$ maximum width of gaps 111 and 211.

The servomotor is capable of developing a force of the order of 100 gr. The desired speed is reached within a period of time of the order of the microsecond, which is lower by a factor of 100 to 1000 than with the best rotating servo-mechanism available.

The air-gaps being of the order of a few cubic millimeters, it follows that, for the frequencies used, for example 400 c./s., the necessary power for both the local and the signal voltages is of the order of one watt, or rather of one voltampere.

The linearity of the device may be further improved. Referring to FIG. 3, the flux between pieces 1004 and 52 may be decomposed into two flux portions:

(a) The magnetic flux $\varphi_1$ contained in gap 111, whose intensity varies with the width of the gap;

(b) the magnetic flux $\varphi_2$ or dispersion flux, formed by the lines of force extending from one piece to the other without crossing gap 111 and whose intensity increases with the distance of the coil turns from the gap and is independent of the width of the gap.

Flux $\varphi_1$ is equal to $$\frac{KI}{e}$$

where $e$ is the width of the gap, K a constant factor, I the current flowing through the corresponding coil. Flux $\varphi_2$, being independent of the gap width, is equal to $kI$ with $k$ being a constant. V, i.e. the voltage across the coil 3, is given by the expression, $$V = \frac{d}{dt}(\varphi_1 + \varphi_2)$$

or $$V = \frac{K}{e} \cdot \frac{dI}{dt} + k\frac{dI}{dt}$$

Figure 4:
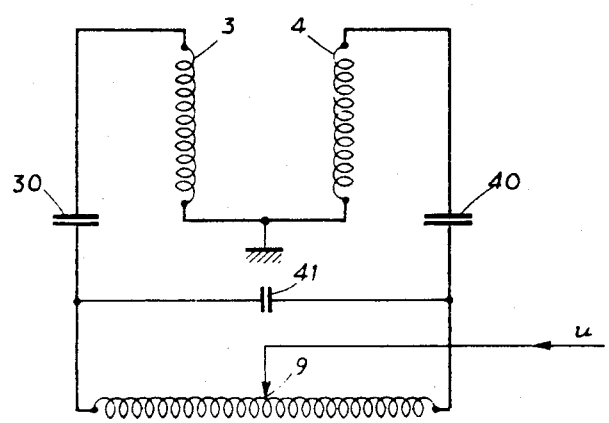
FIGS. 4 and 5 are diagrammatic views of modifications of the device according to the invention.

The term $$k\frac{dI}{dt}$$

may be readily compensated by connecting a capacity in series with the magnetizing coil as shown in the schematic diagram of FIG. 4. Two capacitors 30 and 40 are arranged in series with coils 3 and 4. A capacitor 41 is connected in parallel with windings 3 and 4, with the view of reducing the necessary power.

Figure 5:
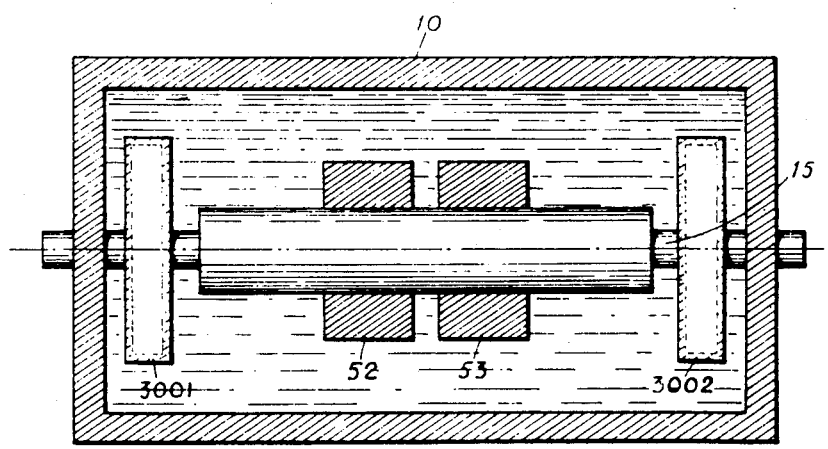

FIG. 5 illustrates, very diagrammatically, casing 10 and the mobile assembly it contains. The polar pieces and the windings are not illustrated. Two floats 3001 and 3002 are mounted on journals 13. The weight of these floats is such that the assembly comprising shaft 15, blocks 52 and 53 and the two floats 3001 and 3002 has the weight of the oil displaced thereby. Thus, whatever the position of the mechanism, the gravitational effect is compensated and the device may operate in any desired position.

A servomotor according to the invention finds many useful applications. Some example of such applications will be described hereinafter.

A servomotor according to the invention is capable of use as an independent device, for example for controlling valves or gates in microsurgery and more generally in any device where limited amplitude displacements having a high degree of accuracy are desired. Whatever the application of the device, the action is constant as long as the signal is applied, it starts almost immediately i.e. 1 μs. upon the application of the signal and terminates as soon as the signal ceases to be applied.

The invention is particularly applicable to analog computers of the type more particularly described in the co-pending patent application, filed by the applicants January 16, 1957, Serial Number 709,383 for "Improvements in Transformer Circuits."

An elementary computer network 300, described in the above mentioned patent application, is illustrated in FIG. 6. It comprises two quadripoles I and II.

Quadripole II comprises a coil 13a, having a susceptance —B and connected across terminals 11a and 11b, a coil 14a, having a susceptance —B and connected across terminals 12a and 12b and two capacitors 15a of the same susceptance 2B, respectively connecting terminal 11a to terminal 12a and terminal 11b to terminal 12b.

Quadripole I comprises a capacitor 13b, having a susceptance B and connected across terminals 11a and 11b, a capacitor 14b of susceptance B connected across terminals 12a and 12b, two variable inductance coils 15b and 15b' of the same susceptance $-B(1+X)$, respectively connecting terminals 11a and 12a and terminals 11b and 12b, and two variable inductance coils 16b and 16b', having the same susceptance $-B(1-X)$ and respectively connecting terminals 11a and 12a and terminals 11b and 12a.

As described in the above mentioned copending application, the computer circuit operates on a predetermined operating frequency in terms of which B is expressed. B is fixed and X varies between $-1$ and $+1$.

When a voltage V is applied across the input terminals 11a and 11b of quadripole I, an output voltage appears across the output terminals 12a and 12b of quadripole II which is equal to XV. Thus, circuit 300 is a multiplier circuit with X as the multiplying factor.

FIG. 7, which corresponds to the FIG. 4 of the patent application mentioned above, shows diagrammatically the variable inductance coil arrangement which may be used in the network of FIG. 6. This arrangement comprises a movable plate 23 which is positioned between pots 103 and 104, respectively containing windings 15b, 15b' and 16b, 16b'. Designating the width of a gap by $e_0$ and by d the distance at a given instant between plate 23 and the plane of symmetry of pots 103 and 104, it can be shown that $$X = \pm d/e_0$$

Figure 8:
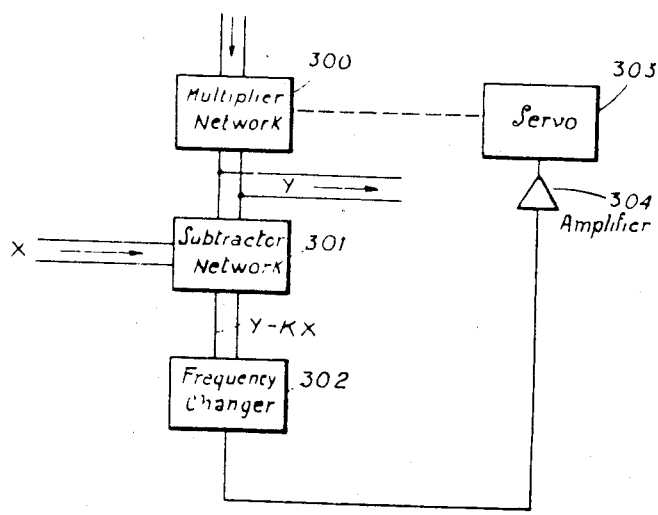

FIG. 8 is an example of the application of a servosystem comprising a servomotor as illustrated in FIGS. 1 and 2 to a network such as network 300 shown in FIG. 6.

This figure shows a circuit of the type described in our United States Patent 2,785,853 of March 19, 1957. It comprises the multiplier network 300 shown in FIG. 6 to which an input voltage having a high frequency, for example 500 kc./s., is applied. The output terminals of this network are coupled to a subtractor 301 network described in the above mentioned patent.

The output of this latter network is applied to the input of a frequency changer 302 of a known type, including for example a rectifier followed by a vibrator at the output of which a low frequency voltage, for example of 400 cycles per second appears, the amplitude of which is proportional to that of the radio frequency input voltage. This voltage is amplified by amplifier 304 and is used as voltage signal u for a servo according to the invention shown at 303. The shaft 15 of this device is tied to plate 23 of the input quadripole I of the multiplier circuit 300.

The amplitude of the radio frequency voltage being taken as unity and Y indicating the multiplication ratio of circuit 300, the output voltage of circuit 300 is equal to Y. This voltage and a voltage X are respectively fed to the two inputs of circuit 301 at the output of which appears voltage $Y-KX$, as shown in the above mentioned Patent 2,785,853. Amplifier 304 provides a voltage which is proportional to voltage $Y-KX$. The mobile assembly of servomotor 303 is set in motion and will stop when $Y=KX$. The arrangement shown in FIG. 8 thus constitutes a negative feedback amplifier, the gain K of which is rigorously constant.

Figure 9:
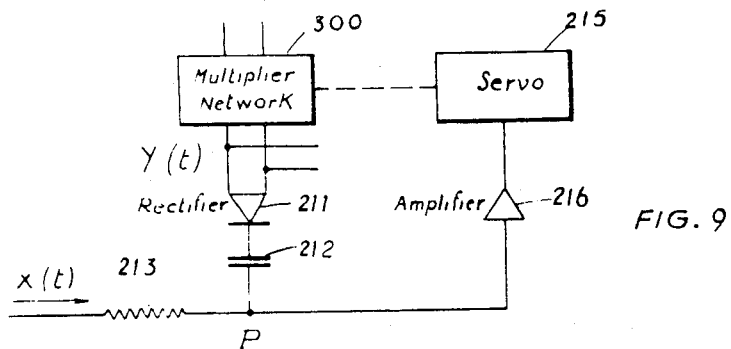

FIG. 9 illustrates an integrator arrangement comprising a servosystem according to the invention.

This arrangement includes a multiplying circuit 300. At the input of this circuit, is connected a voltage of a frequency of the order of 500 kc./s., the amplitude of which is taken as unity. The output of this cell is connected to the input of a rectifier device 211. A capacitor 212 has one of its terminals connected to the output of rectifier 211 and the other, through a resistance 213, to a source which provides a voltage X $(t)$, variable as a function of time. A terminal P which is common to resistor 213 and capacitor 212 is connected through an amplifier 216 to the signal input of a servomotor 215 according to the invention. Servo 215 controls the mobile plate 23 of the variable inductance arrangement of circuit 300.

This arrangement operates as follows. In the same way as in the arrangement shown in FIG. 8, servo 215 causes the multiplying factor Y of network 210 to vary until the signal voltage appearing at point P is zero, which means that the currents flowing through capacitor 212 having a capacity C and through resistance 213 having a value R are equal and of opposite sign, i.e. that $$C\frac{dY}{dt} + \frac{X(t)}{R} = 0$$

and $$Y = -\int \frac{1}{RC} X(t) dt$$

Voltage Y is available at the output of network 300 and may be used, for example, in analog computer circuits.

Since the two devices just described operate by comparison, the precision with which the multiplying network performs the multiplication does not matter.

Figure 11:
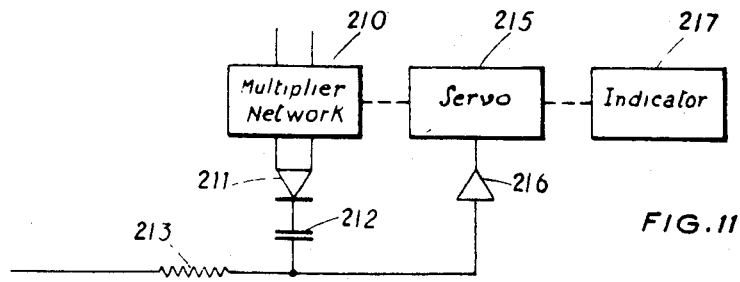
Figure 10:
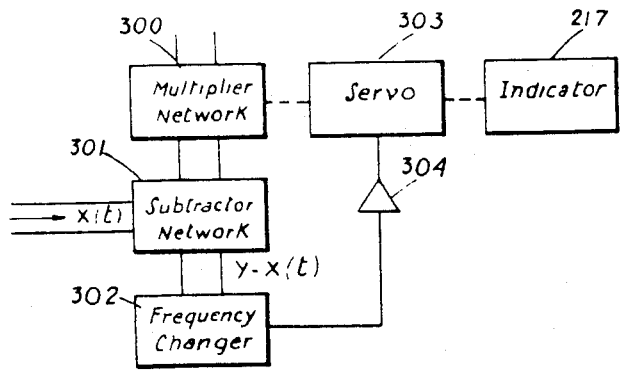

The arrangements shown in FIGS. 10 and 11 are entirely identical to those of FIGS. 8 and 9 respectively, except that a mechanical indicator 217 is provided which indicates the position and the speed of the serve.

Figure 12:
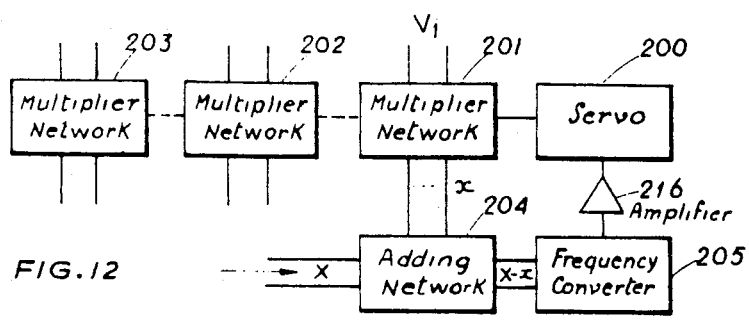

FIG. 12 shows a further example of application of the invention. In this example, a servomotor 200 is mechanically connected to three multiplying networks 201, 202 and 203 which may operate on three different frequencies $F_1$, $F_2$ and $F_3$. Network 201 is coupled to an adding network 204, the output of which controls servomotor 200 through a frequency converter 205 and amplifier 206, in the same way as in the arrangement of FIG. 8. Network 204 also receives a voltage having an amplitude X and frequency $F_1$. Servomotor 200 adjusts the respective multiplication coefficients of cells 201, 202 and 203.

FIG. 13 is a cross section of an arrangement resulting from the combination of a servomotor according to the present invention and of a preferred embodiment of the variable inductance device comprised in network 300 shown in FIG. 6. This variable inductance device is described in the copending patent application 709,383 mentioned above and filed by the applicants January 16, 1958 for "Improvements in Transformer Circuits." The same references designate the same elements in FIGS. 2 and 13.

The assembly comprises a casing 10a, shaped as a cylinder of revolution which is entirely identical to the casing shown in FIG. 2 except that it is longer and contains, in addition to the servo system, the variable inductance device described in the above copending application.

The servo shown in FIG. 2 is located in the left hand portion of cylinder 10 and is separated by a resilient washer 20b from the variable inductance device. The latter comprises stationary magnetic elements 3001 to 3004, respectively similar to elements 1001 to 1004, and elements 4001 to 4004, symmetrically located with respect to elements 3001 to 3004 and similar to elements 2001 and 2004.

Shaft 15a carries mobile magnetic blocks 62 and 63, similar to blocks 52 and 53 and positioned in the same way with respect to stationary magnetic elements. While the servomotor comprises two coils 3 and 4 which are fed as shown in FIG. 1, the variable inductance assembly comprises four coils 15b, 15b', 16b and 16b' as shown in FIG. 6.

It is obvious that ferromagnetic elements do not have the same thermal expansion coefficient as the non ferromagnetic elements. However, the fact that tubes 103, rings 110 and shaft 15 or 15a have the same expansion coefficient assure that, whatever the temperature, the mobile magnetic elements are always in the same position with respect to fixed magnetic elements.

Experience shows that the assembly of FIG. 13 is highly precise and makes it possible to carry on variable inductance coil adjustments with a very high degree of accuracy.

What is claimed is:

1. A translation servomotor comprising: two magnetic pieces symmetrical with respect to a plane and having a common axis, each having at least one polar surface parallel to said plane; two coils respectively supported by said pieces and having turns coaxial therewith; a non magnetic shaft movable along said axis and carrying at least one magnetic body for completing respective magnetic circuits with said pieces; means for providing a fixed voltage and a variable voltage having the same frequency and phase shifted by K$\pi$ with respect to each other, K being an integer; means for feeding to said coils respectively the sum and the difference of said voltages; and means for balancing the acceleration energy of said movable shaft.

2. A translation servomotor comprising: two magnetic pieces symmetrical with respect to a plane and having a common axis, each having at least one polar surface parallel to said plane; two coils respectively supported by said pieces and having turns coaxial therewith; a non magnetic shaft movable along said axis and carrying two magnetic bodies, magnetically decoupled from each other, for completing respective magnetic circuits with said two pieces; means for providing a fixed voltage and a variable voltage having the same frequency and phase shifted by K$\pi$ with respect to each other, K being an integer; means for feeding to said coils respectively the sum and the difference of said voltages; and means for hydraulically balancing the acceleration energy of said movable shaft.

3. A translation servomotor comprising: two magnetic pieces symmetrical with respect to a plane and having a common axis, each having one polar surface parallel to said plane and one normal thereto; two coils, respectively supported by said pieces and having turns coaxial therewith; a non magnetic shaft movable along said axis and carrying two magnetic bodies magnetically decoupled from each other, said bodies having respective polar surfaces parallel to said normal polar surfaces and bounding respectively therewith fixed width gaps and respective polar surfaces parallel to said parallel surfaces and bounding respectively therewith variable width gaps; means for providing a fixed voltage and a variable voltage having the same frequency and phase shifted by K$\pi$ with respect to each other, K being an integer; means for feeding to said coils respectively the sum and the difference of said voltages; and means for hydraulically balancing the acceleration energy of said movable shaft.

4. A translation servomotor comprising: two magnetic pieces symmetrical with respect to a plane and having a common axis, said pieces being bodies of revolution about said axis and having a central cavity having one wall presenting a polar surface parallel to said plane and another wall presenting another polar surface normal to said plane; two coils respectively supported by said pieces and having turns coaxial therewith, said coils partially bounding said cavity; a mobile assembly comprising a non magnetic shaft, movable along said axis and carrying two magnetic bodies of revolution about said axis respectively substantially coextensive with said cavities, said bodies having respective polar surfaces parallel to said normal polar surfaces and bounding respectively therewith fixed width gaps and respective surfaces parallel to said parallel surfaces and bounding therewith variable width gaps; means for providing a fixed voltage and a variable voltage having the same frequency and phase shifted by K$\pi$ with respect to each other, K being an integer; means for feeding to said coils respectively the sum and the difference of said voltages; and means for hydraulically balancing the accelerating energy of said mobile assembly.

5. A translation servomotor comprising: two magnetic pieces symmetrical with respect to a plane and having a common axis, said pieces being bodies of revolution about said axis and having a central cavity and a hub portion within said cavity, said hub portion defining in said central cavity, an annular cavity and having a polar surface parallel to said plane, said central cavity having a polar surface normal to said plane; two coils respectively supported on said hub portions and within said annular cavities and having turns coaxial therewith; a mobile assembly comprising a non magnetic shaft, movable along said axis and carrying two magnetic bodies of revolution about said axis, having respective polar surfaces coextensive with said polar surfaces of said hub portions and bounding respectively therewith variable width gaps, said bodies having respective other polar surfaces parallel to said normal polar surfaces and bounding respectively therewith fixed width gaps; means for providing a fixed voltage and a variable voltage having the same frequency and phase shifted by K$\pi$ with respect to each other, K being an integer; means for feeding to said coils respectively the sum and the difference of said voltages; and means for hydraulically balancing the accelerating energy of said mobile assembly.

6. A translation servomotor comprising: two magnetic pieces symmetrical with respect to a plane and having a common axis, said pieces being bodies of revolution about said axis and having a central cavity and a hub portion within said cavity, said hub portion defining in said central cavity an annular cavity and having a polar surface parallel to said plane, said central cavity having a polar surface normal to said plane; two coils respectively supported on said hub portions and within said annular cavities and having turns coaxial therewith; a mobile assembly comprising a non magnetic shaft, movable along said axis and carrying two magnetic bodies of revolution about said axis having respective polar surfaces coextensive with said polar surfaces of said hub portions and bounding respectively therewith variable width gaps, said bodies having respective other polar surfaces parallel to said normal polar surfaces, and bounding respectively therewith fixed with gaps; means for providing a fixed voltage and a variable voltage having the same frequency and phase shifted by $K\pi$ with respect to each other, $K$ being an integer; means for feeding to said coils respectively the sum and the difference of said voltages; a container comprising said magnetic pieces and having lateral walls; means for slidably supporting said shaft in said walls; and means for filling said casing with a braking oil.

7. A translation servomotor comprising: two magnetic pieces symmetrical with respect to a plane and having a common axis, said pieces being bodies of revolution about said axis and having a central cavity and a hub portion within said cavity, said hub portion defining in said central cavity an annular cavity and having a polar surface parallel to said plane and said central cavity having a polar surface normal to said plane; two coils respectively supported on said hub portions and within said annular cavities and having turns coaxial therewith; a mobile assembly comprising a non magnetic shaft, movable along said axis and carrying two magnetic bodies of revolution about said axis having respective polar surfaces coextensive with said polar surfaces of said hub portions and bounding respectively therewith variable width gaps, said bodies having respective polar surfaces parallel to said normal polar surfaces and bounding respectively therewith fixed with gaps; a first transformer having a primary winding and a secondary winding having two terminals and a middle point, said two coils being respectively connected between one of said terminals and ground; a second transformer having a primary winding and a secondary winding; means for connecting said last mentioned secondary winding between ground and the middle point of said secondary winding of said first transformer; means for feeding respectively to said primary windings a fixed and a variable voltage having the same frequency and being phase shifted by $K\pi$ with respect to each other, $K$ being an integer; a container comprising said magnetic pieces and having lateral walls; means for slidably supporting said shaft in said walls; and means for filling said casing with a braking oil.

8. A device as claimed in claim 7 further comprising a first and a second capacitor respectively series connected between said first and said second coils and said secondary winding of said first transformer, a third fixed capacitor being parallel connected across said secondary winding.

9. A device as claimed in claim 7 further comprising a first and a second float mounted on said shaft, the total weight of said floats and said mobile assembly being equal to the weight of the oil displaced thereby.

10. A combination comprising: a servomotor as claimed in claim 1; a quadripole for computer and transformer circuits, said quadripole comprising two input and two output terminals, two fixed capacitors of equal value connecting respectively said input terminals and said output terminals, two pairs of variable inductance assemblies for connecting each input terminal to each output terminal; said quadripole being always resonant with one of said pairs of terminal shorted; and means associated with said shaft for varying the inductance of said assemblies between zero and a predetermined value.

11. A combination according to claim 10, said assemblies each comprising two symmetrical magnetic induction pots respectively receiving said two pairs of coils and a magnetic armature movable by translation between said pots for increasing the gap between itself and one of said pots while simultaneously decreasing the gap between itself and the other pot, said shaft being mechanically coupled to said plate.

12. A combination according to claim 11 wherein said pots each have two polar surfaces, said shaft of the servomechanism slidably extending along the common axis of said pots and carrying two magnetic armatures respectively associated with said pots, magnetically insulated from each other and each having two polar surfaces, respectively facing said polar surfaces of the associated pot and separated therefrom by respective gaps, one of said gaps being variable and extending normally to said axis, said coils surrounding respectively said variable gaps.

References Cited in the file of this patent
UNITED STATES PATENTS

| | | |
|---|---|---|
| 1,955,676 | Herchert | Apr. 17, 1934 |
| 2,558,708 | Macgeorge | June 26, 1951 |
| 2,602,660 | Shannon | July 8, 1952 |
| 2,706,799 | Howe et al. | Apr. 19, 1955 |
| 2,814,768 | Kinkel | Nov. 26, 1957 |
| 2,830,242 | Darling | Apr. 8, 1958 |
| 2,931,963 | Wilson | Apr. 5, 1960 |

OTHER REFERENCES

C. J. Savant: Basic Feedback Control System Design, FIGS. 1–4, page 4, McGraw Hill, 1958.